(12) United States Patent
Olbrich

(10) Patent No.: US 7,420,540 B2
(45) Date of Patent: Sep. 2, 2008

(54) DETERMINING POSITIONING AND/OR RELATIVE MOVEMENT OF GRAPHICAL-USER INTERFACE ELEMENT BASED ON DISPLAY IMAGES

(76) Inventor: Craig A. Olbrich, 2923 NE. Conser St., Corvallis, OR (US) 97330

( * ) Notice: Subject to any disclaimer, the term of this patent is extended or adjusted under 35 U.S.C. 154(b) by 1091 days.

(21) Appl. No.: 10/726,078

(22) Filed: Dec. 1, 2003

(65) Prior Publication Data

US 2005/0116931 A1  Jun. 2, 2005

(51) Int. Cl.
*G09G 5/00* (2006.01)
(52) U.S. Cl. .................. 345/158; 345/156; 345/157
(58) Field of Classification Search ......... 345/156–160, 345/162–166, 169–170, 173–175, 179–180, 345/184, 1.2, 2.1, 2.2, 2.3; 178/18.01
See application file for complete search history.

(56) References Cited

U.S. PATENT DOCUMENTS

| 5,138,304 | A | | 8/1992 | Bronson |
| 5,453,759 | A | | 9/1995 | Seebach |
| 5,515,079 | A | | 5/1996 | Hauck |
| 5,528,263 | A | * | 6/1996 | Platzker et al. ............... 345/156 |
| 5,914,783 | A | * | 6/1999 | Barrus ......................... 356/614 |
| 5,926,168 | A | | 7/1999 | Fan |
| 6,275,214 | B1 | * | 8/2001 | Hansen ....................... 345/158 |
| 6,331,848 | B1 | | 12/2001 | Stove et al. |
| 6,346,933 | B1 | * | 2/2002 | Lin ............................. 345/157 |
| 6,512,507 | B1 | | 1/2003 | Furihata et al. |
| 6,535,198 | B1 | | 3/2003 | Fan |
| 6,542,087 | B2 | | 4/2003 | Lin |
| 6,803,906 | B1 | * | 10/2004 | Morrison et al. ............ 345/173 |
| 7,193,608 | B2 | * | 3/2007 | Stuerzlinger ................ 345/156 |
| 2002/0097230 | A1 | | 7/2002 | Lowry et al. |

* cited by examiner

*Primary Examiner*—Richard Hjerpe
*Assistant Examiner*—Mansour M Said

(57) ABSTRACT

A system for a computing device of one embodiment of the invention is disclosed that includes an image-capturing mechanism and a controller. The image-capturing mechanism is capable of capturing images. Each image includes at least one corner of a display communicatively coupled to the computing device. The controller is to determine at least one of positioning and relative movement for a graphical-user interface element displayed on the display, based on the images captured by the image-capturing mechanism.

39 Claims, 8 Drawing Sheets

US 7,420,540 B2

DETERMINING POSITIONING AND/OR RELATIVE MOVEMENT OF GRAPHICAL-USER INTERFACE ELEMENT BASED ON DISPLAY IMAGES

BACKGROUND OF THE INVENTION

Projection-type display devices have proven popular in environments in which many people have to view the display device at the same time. Projection-type display devices are thus especially used in conference rooms and at conferences in hotels and conference centers. For instance, presentations are typically given within these conferences, and displayed using these display devices. As their prices have decreased, projection-type display devices are also becoming more common features of home theater set-ups.

One difficulty in using these sorts of display devices is that the people giving the presentations may need to have access to the computing devices driving the projection-type display devices, in order to switch between slides within the presentations, as well as perform other types of actions. In a typical desktop computing device, the most common input devices to perform such functionality are the mouse and the keyboard. In a typical laptop computing device, the most common input devices are usually the touchpad and the keyboard.

These sorts of input devices, however, usually require users to remain relatively close to their host computing devices. This can be problematic in the context of presentations. The presenters may roam in the front of the rooms in which the presentations are being held, and may not necessarily be close to the computing devices when they need to switch slides or perform other types of actions. The two alternatives that these presenters face, either staying close to the computing devices at all times or quickly scampering back to the computing devices when they need to switch slides, are, however, less than convenient and desirable.

SUMMARY OF THE INVENTION

A system for a computing device of one embodiment of the invention includes an image-capturing mechanism and a controller. The image-capturing mechanism is capable of capturing images. Each image includes at least one corner of a display communicatively coupled to the computing device. The controller is to determine at least one of positioning and relative movement for a graphical-user interface element displayed on the display, based on the images captured by the image-capturing mechanism.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Overview

Figure 1:
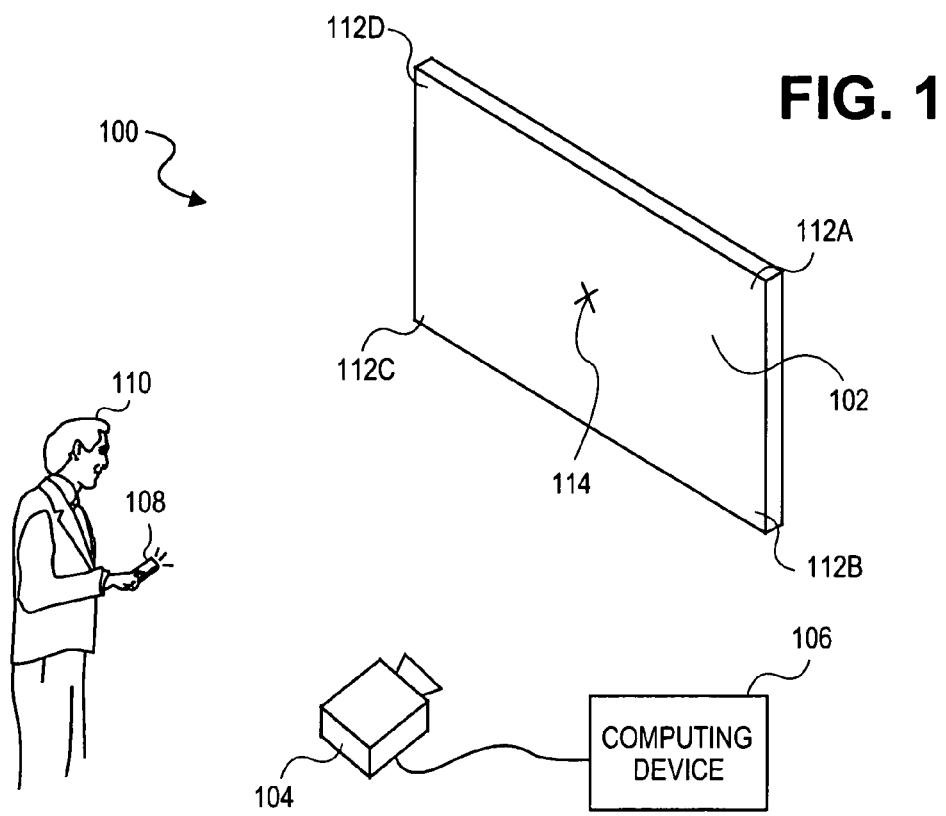
FIG. 1 is a diagram of an example situation in conjunction with an embodiment of the invention may be implemented, according to an embodiment of the invention.

FIG. 1 shows an example scenario 100 in which an embodiment of the invention may be implemented or employed, according to an embodiment of the invention. The scenario 100 includes a screen 102 on which images are projected by a projection display device 104 that is communicatively coupled to a computing device 106. The screen 102 is more generally an object on which the projection display device 104 projects images, and may alternatively be a wall or another type of object. The screen 102 and the projection display device 104 may together or separately constitute a display in one embodiment of the invention. Other types of displays that are amenable to different embodiments of the invention include cathode-ray tube (CRT) display devices, liquid-crystal display (LCD) devices, flat-panel display (FPD) devices, plasma display devices, as well as other types of display devices. The display may be at least substantially rectangularly shaped.

The computing device 106 may be a desktop computer, a laptop computer, a handheld computing device, a personal-digital assistant (PDA) device, an audio-visual device, a visual-only device, or another type of computing device. Whereas the display including the projection display device 104 is depicted in FIG. 1 as being external to the computing device 106, in other embodiments of the invention the display may be internal to and part of the computing device 106. For example, the LCD or other type of FPD of a laptop computer is typically internal to a part of the computing device 106. The computing device 106 causes images to be displayed on or by the display. In the scenario 100 of FIG. 1, the computing device 106 causes the projection display device 104 to project images on the screen 102.

The scenario 100 further includes a pointing device 108 for the computing device 106, controlled by a user 110. The pointing device 108 captures images of at least one of the corners 112A, 112B, 112C, and 112D, collectively referred to as the corners 112, of the display, and potentially of the center 114 of the display. The user 110 may aim the pointing device 108 at the position on the display at which the user 110 wishes to locate a graphical-user interface element displayed on the display by the computing device 106. The graphical-user interface element may be a mouse pointer, as is common in graphical-user interface-oriented operating systems, or another type of graphical-user interface element.

The user 110 may also move the pointing device 108 while aiming the device 108 at the display, such that the user 110 indicates the desired direction and amount of movement of the graphical-user interface element. Based on the images captured by the pointing device 108 while the user 110 aims and/or moves the pointing device 108 relative to the display, the positioning and/or relative movement of the graphical-user interface element is then determined. In turn, the graphical-user interface element may be correspondingly positioned and/or moved.

Figure 2A:
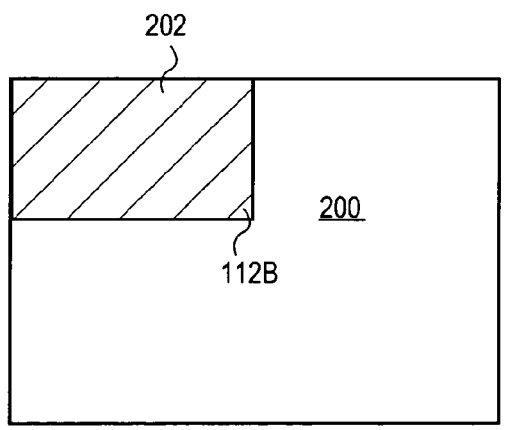
FIGS. 2A and 2B are diagrams of example images captured by an image-capturing mechanism to determine positioning and/or relative movement for a graphical-user interface element, according to an embodiment of the invention.
Figure 2B:
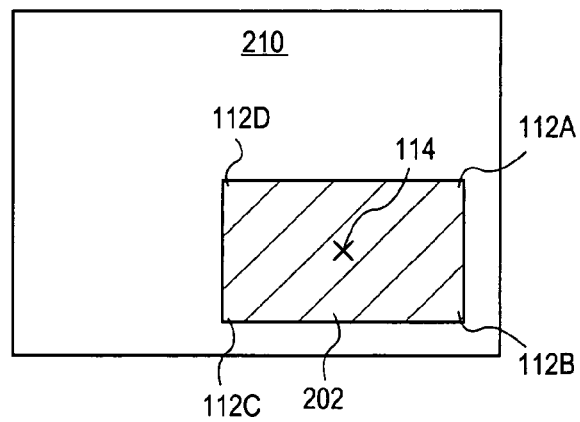

FIGS. 2A and 2B show two example images 200 and 210, respectively, that may be captured by the pointing device 108, according to varying embodiments of the invention. In FIG. 2A, the example image 200 includes a portion of a display 202, such as the screen 102 of FIG. 1, including the corner 112B thereof. In FIG. 2B, the example image 210 includes the display 202 completely, including the corners 112A-D and the center 114 thereof. The display 202 in the images 200 and 210 may be the brightest object within the images 200 and 210, and the images 200 and 210 may include other objects and features besides the display 202, although for illustrative clarity none are depicted in FIGS. 2A and 2B. Based on the images captured by the pointing device 108, such as the example images 200 and 210, the positioning and/or relative movement for a graphical-user interface element may be determined, two embodiments for doing so being particularly described in the following sections of the detailed description. It is noted that the display 202 shown in the images 200 and 210 of FIGS. 2A and 2B is depicted as being substantially rectangular in shape. However, as can be appreciated by those of ordinary skill within the art, in actuality the display 202 may be an angular transformation of a rectangle shape, due to the pointing device 108 being non-perpendicular to the display 202, such as the screen 102 of FIG. 1.

Determining Relative Movement Based on Captured Images

Figure 3A:
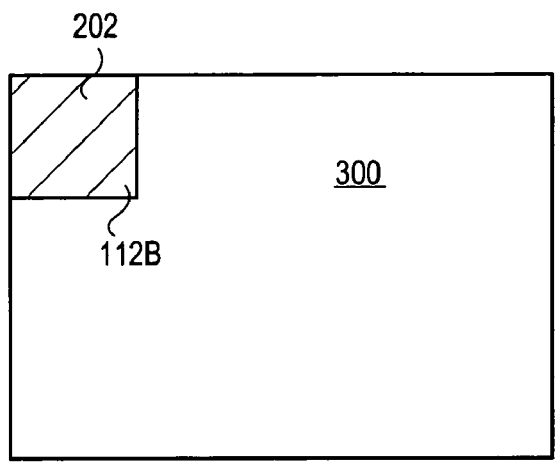
FIGS. 3A and 3B are diagrams of example images captured by an image-capturing mechanism to determine relative movement for a graphical-user interface element, according to an embodiment of the invention.
Figure 3B:
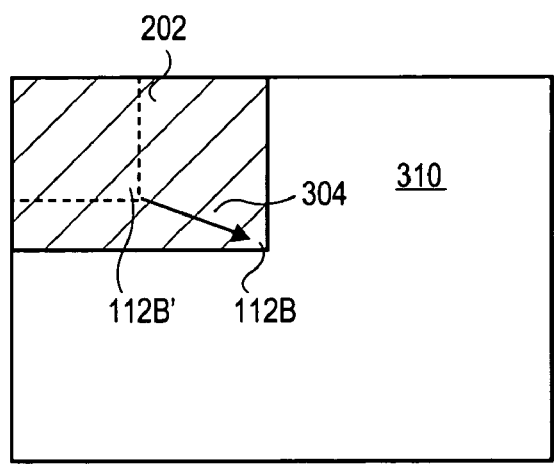

In one embodiment of the invention, the relative movement for a graphical-user interface element is determined based on the images captured by the pointing device 108. FIGS. 3A and 3B show two example images 300 and 310, according to an embodiment of the invention, in conjunction with which such relative movement may be determined. The image 300 is captured by the pointing device 108 before the user 110 has moved the device 108. In the image 300, a portion of the display 202 is depicted, where the corner 112B thereof is at a particular location.

The image 310 is captured by the pointing device 108 after the user 110 has moved the device 108. In the image 310, a portion of the display 202 is again depicted, where the corner 112B has moved between the images 300 and 310 from its location in the image 300, as indicated as the location 112B' in FIG. 3B, to a new location. The amount and direction of movement of the corner 112B of the display 202 is indicated by the arrow 304.

Figure 4A:
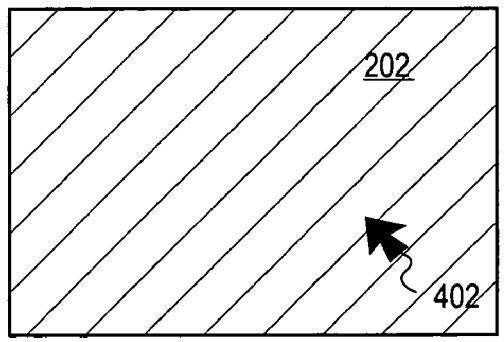
FIGS. 4A and 4B are diagrams of the movement of the graphical-user interface element on a display based on the images captured by an image-capturing mechanism in FIGS. 3A and 3B, according to an embodiment of the invention.
Figure 4B:
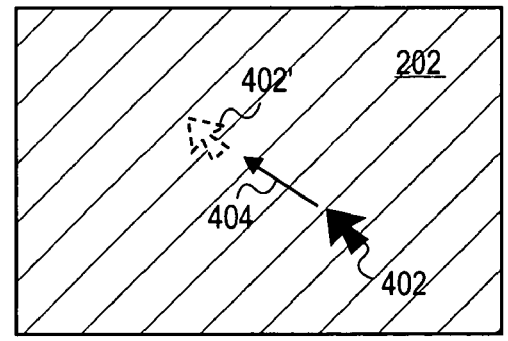

FIGS. 4A and 4B show two examples of a graphical-user interface element 402, such as a mouse pointer, on the display 202, where the element 402 has been moved based on the images 300 and 310 of FIGS. 3A and 3B, according to an embodiment of the invention. The display 202 in FIG. 4A depicts the location of the graphical-user interface element 402 when the image 300 of FIG. 3A has been captured. The element 402 is depicted as a mouse pointer in this embodiment of the invention.

The display 202 in FIG. 4B depicts the location of the graphical-user interface element 402 as has been moved on the display 202 after the image 310 of FIG. 3B has been captured. The element 402 thus has been moved from its location on the display 202 in FIG. 4A, indicated as the location 402' in FIG. 4B, to a new location, as indicated by the arrow 404. The arrow 404 has the opposite direction as the arrow 304 of FIG. 3B, indicating that the graphical-user interface element 402 has moved in the opposite direction between FIGS. 4A and 4B as the corner 112B has moved between FIGS. 3A and 3B, comparable to the opposite directions of the arrows 604 and 702 of FIGS. 6 and 7, as will be described.

The length of the arrow 404, corresponding to the amount of movement of the element 402 between FIGS. 4A and 4B may be different than the length of the arrow 304, which corresponds to the amount of movement of the corner 112B between FIGS. 3A and 3B. However, the amount of movement of the element 402 may be proportional to the amount of movement of the corner 112B. For instance, the amount of movement of the corner 112B relative to the size of the images 300 and 310, which may be identical, may be the same as the amount of movement of the graphical user-interface element 402 relative to the size of the display 202.

Thus, the graphical-user interface element 402 has its relative movement determined between FIGS. 4A and 4B based on a change in position of the corner 112B of the display 202 between FIGS. 3A and 3B. The example of relative movement for the element 402 depicted with respect to FIGS. 3A-3B and 4A-4B relies upon the corner 112B moving between the image 300 of FIG. 3A and the image 310 of FIG. 3B. However, this is just one example. The other corners 112A, 112C, and 112D of the display 202, as well as the center 114 of the display 202, may also have their movement tracked between successive images captured by the pointing device 108 to determine relative movement for the element 402. The corner, corners, or the center 114 of the display 202 upon which basis relative movement is determined may be selected based on which corner, corners, or the center 114 is within both successive images.

Figure 5:
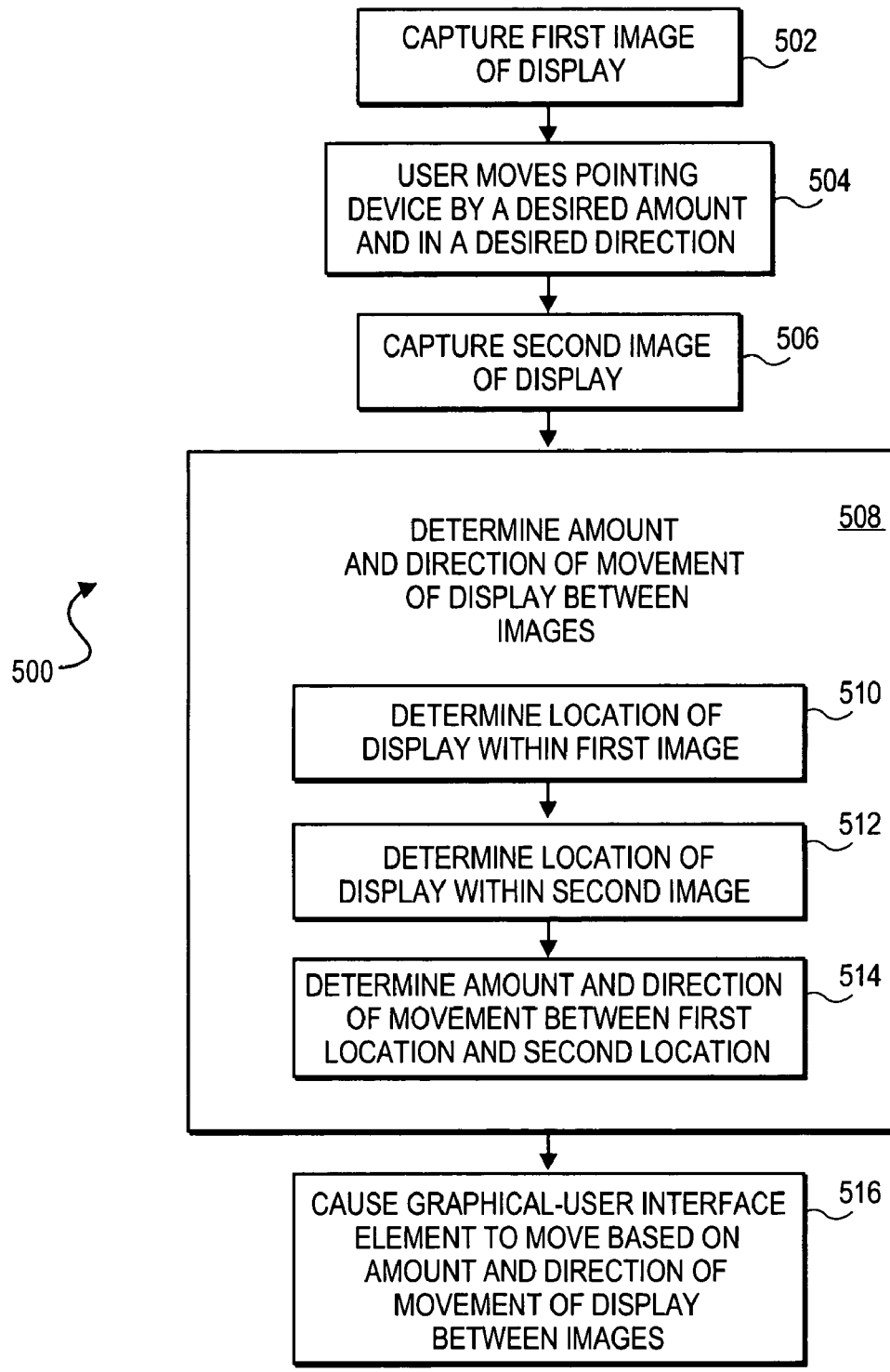
FIG. 5 is a flowchart of a method for determining relative movement for a graphical-user interface element based on images captured by an image-capturing mechanism, according to an embodiment of the invention.

FIG. 5 shows a method 500 for determining the relative movement of a graphical-user interface element based on images captured by the pointing device 108, according to an embodiment of the invention. The method 500 may be performed to cause the relative movement of the graphical-user interface element 402 between FIGS. 4A and 4B, based on the images 300 and 310 of FIGS. 3A and 3B. The method 500 may further be performed in conjunction with the scenario 100 of FIG. 1.

A first image of at least one of the corners 112 of the display 202 communicatively coupled to the computing device 106 is captured (502). The phrase "at least one of the corners 112" of the display 202 is inclusive of the center 114 of the display 202 being captured within an image as well. The user 110 next moves the pointing device 108 in a direction and by an amount at which the user 110 desires to have the graphical-user interface element 402 moved on the display 200 (504). A second image of at least one of the corners 112 of the display 200 is then captured (506).

The amount and direction of the movement of at least one of the corners 112 of the display 200 between the captured images is determined (508). This can include determining the location of at least one of the corners 112 within the first image (510), and determining the location of the same corner(s) within the second image (512). Based on these locations, the amount and direction of movement of at least one of the corners 112 between their locations in the first image and their locations in the second image can then be determined (514).

Thereafter, the graphical user-interface element 402 is caused to be displayed on the display 200, such that the element 402 is moved based on the amount and the direction of movement of at least one of the corners 112 of the display 200 between the images (516). For example, the element 402 may be moved in the opposite direction as the direction of the movement of at least one of the corners 112 between the images. Furthermore, the element 402 may be moved by an amount that is proportional to the amount of movement of at least one of the corners 112 relative to the size of the images themselves, as has been described in relation to FIGS. 4A and 4B.

Determining Absolute Positioning Based on Captured Images

Figure 6:
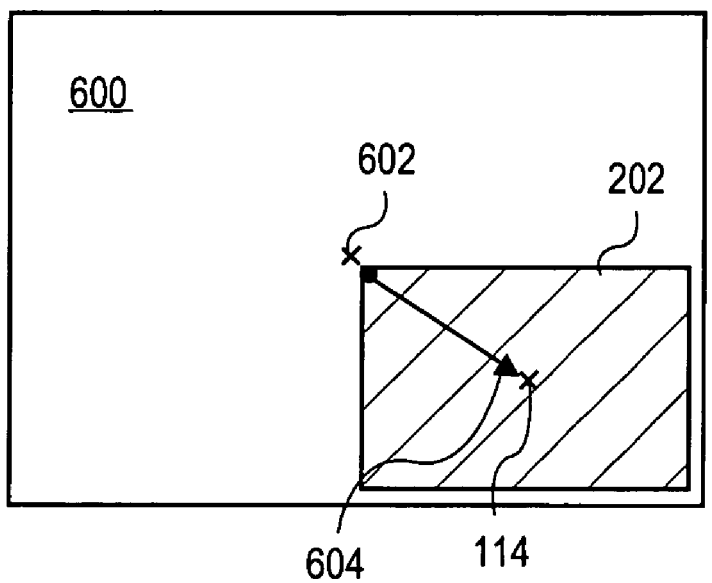
FIG. 6 is a diagram of an example image captured by an image-capturing mechanism to determine positioning for a graphical-user interface element, according to an embodiment of the invention.

In one embodiment of the invention, the positioning, or absolute positioning, for a graphical-user interface element is determined based on an image captured by the pointing device 108. FIG. 6 shows an example image 600, according to an embodiment of the invention, in conjunction with which such positioning or absolute positioning may be determined. The image 600 is captured by the pointing device 108. In the image 600, the display 202 is completely depicted, where the center 114 thereof is at a particular location. The center 114 of the display 202 is offset from the center 602 of the image 600 itself by an offset amount and an offset direction indicated by the arrow 604.

Figure 7:
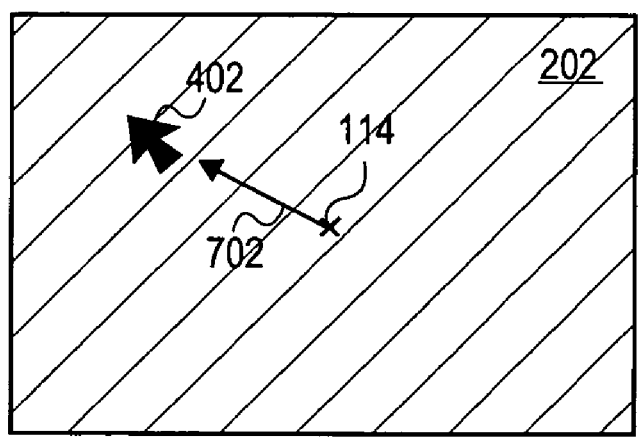
FIG. 7 is a diagram of the positioning of the graphical-user interface element on a display based on the image captured by an image-capturing mechanism in FIG. 6, according to an embodiment of the invention.

FIG. 7 shows an example of a graphical-user interface element 402, such as a mouse pointer, on the display 202, where the element 402 has been positioned or located based on the image 600 of FIG. 6, according to an embodiment of the invention. The element 402 has been located or positioned by an amount and in a direction away from the 114 of the display 202 as indicated by the arrow 702. The arrow 702 has a direction opposite to that of the arrow 604 of FIG. 6, indicating that the graphical-user interface element 402 has been positioned in the opposite direction away from the 114 of the display 202 as compared to the direction the center of the display 114 is positioned in away from the center 602 of the image 600 in FIG. 6.

The positioning of the element 402 within the display 202 in a direction opposite to the direction of the positioning of the display 202 within the image 600 results because in FIG. 6 the image 600 including the display 202 has been captured such that the user is pointing the pointing device 108 up and to the left relative to the display 202, the display 202 being captured in the image 600 as down and to the right. Therefore, the user's pointing the pointing device 108 up and to the left relative to the display 202 is indicative of the user's desire to position the element 402 up and to the left within the display 202. That is, the graphical-user interface element 402 is positioned in a direction relative to the center 114 of the display 202 opposite to the direction of the center 114 of the display 202 relative to the center 602 of the image 600.

The length of the arrow 702, corresponding to the distance of the location of the element 402 in FIG. 7 away from the 114 of the display 202 may be different than the length of the arrow 602, which corresponds to the distance of the location of the center 114 of the display 202 from the center 602 of the image 600. However, the amount by which the location of the element 402 is away from the 114 of the display 202 in FIG. 7 may be proportional to the amount by which the 114 of the display 202 is away from the center 602 of the image 600 in FIG. 6. For instance, the distance of the center 114 from the center 602 relative to the size of the image 600 in FIG. 6 may be the same as the distance of the location of the element 402 from the 114 relative to the size of the display 202 in FIG. 7.

Thus, the graphical-user interface element 402 has its position or absolute position determined in FIG. 7 based on a position of the 114 of the display 202 relative to a field of view of the image 600 in FIG. 6. The field of view of the image 600 is relevant in this determination in that the distance and direction between the center 602 of the image 600 and the 114 of the display 202 can be the basis upon which the position of the element 402 is determined relative to the 114 of the display 202. The example of positioning and absolute positioning of the element 402 depicted with respect to FIGS. 6 and 7 relies upon determining the location of the 114 of the display 202 within the image 600. However, this is just one example. At least one of the corners 112, in addition to or in lieu of the 114, may also have their positions or locations determined relative to the field of view of the image 600 to determine positioning or absolute positioning for the element 402.

Figure 8:
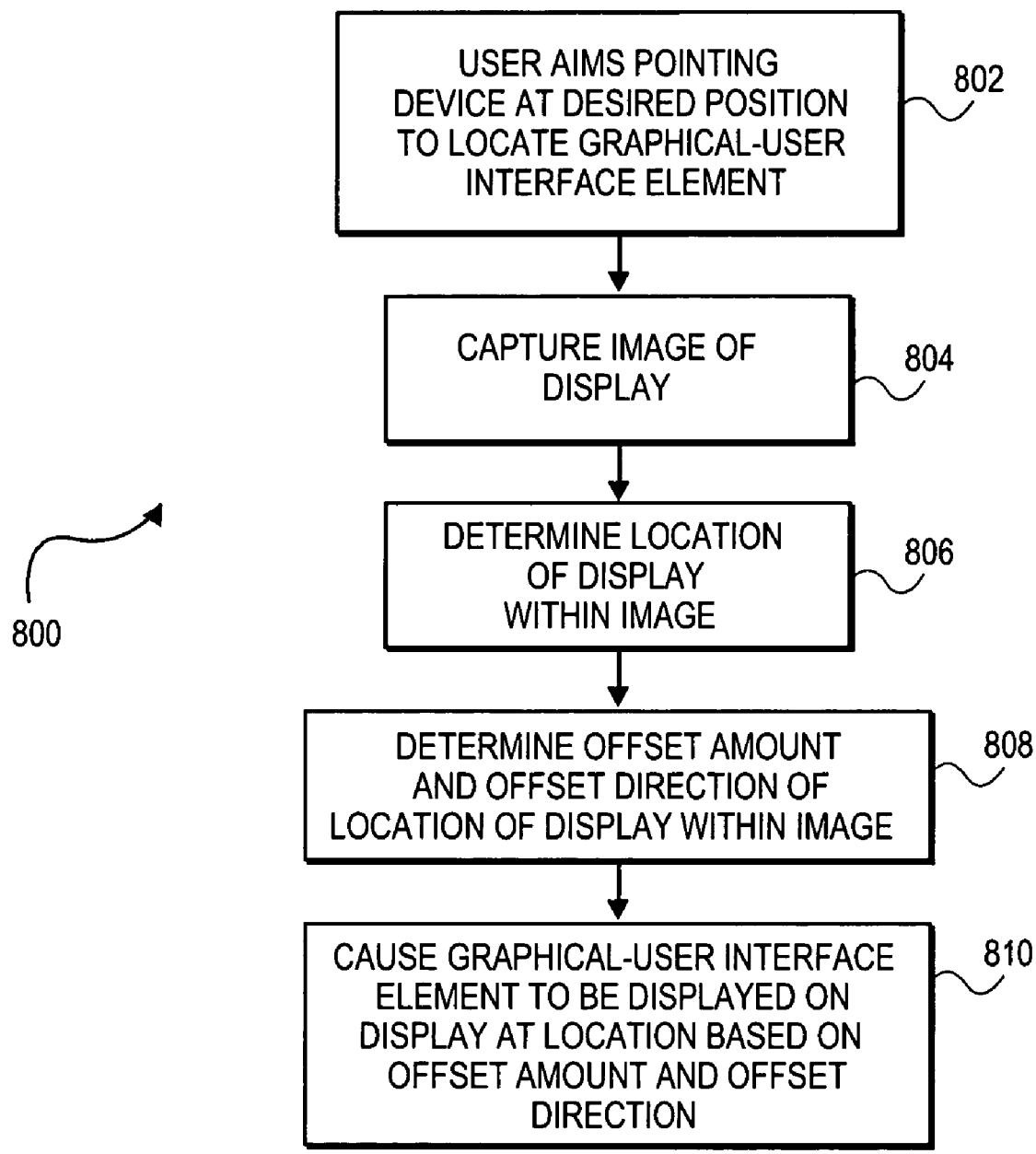
FIG. 8 is a flowchart of a method for determining positioning for a graphical-user interface element based on an image captured by an image-capturing mechanism, according to an embodiment of the invention.

FIG. 8 shows a method 800 for determining the positioning or absolute positioning of a graphical-user interface element based on an image captured by the pointing device 108, according to an embodiment of the invention. The method 800 may be performed to cause the positioning of the graphical-user interface element 402 in FIG. 7 based on the image 600 of FIG. 6. The method 800 may further be performed in conjunction with the scenario 100 of FIG. 1.

The user 110 aims the pointing device 108 at a position at which the user 110 desires to have the graphical-user interface element 402 displayed on the display 202 (802). An image is captured of the display 202 (804). For instance, an image may be captured of at least the center 114 of the display 202. The phrase "at least the center 114" of the display 202 is inclusive of at least one of the corners 112 of the display 202 being captured within an image as well.

The location of the display 202 within the image is determined (806). For instance, the location of at least the center 114 of the display 202 within a field of view of the image may be determined. The offset amount and offset direction of the location of the display 202 within the image is then determined (808). For instance, the offset amount may be the distance of the location of the center 114 of the display 202 away from the location of the center of the image. The offset direction may be the direction from the center of the image to the center 114 of the display 202.

Finally, the graphical-user interface element 402 is caused to be displayed on the display 202 at a location based on the offset amount and the offset direction that have been determined (810). For example, the direction of the position of the element 402 relative to the center 114 of the display 202 may be the opposite of the direction of the center 114 of the display 202 relative to the center of the image, as has been described, and thus may be opposite of the offset direction. Furthermore, the distance of the position of the element 402 away from the center 114 of the display 202 relative to the size of the display 202 may be proportional to the distance of the position of the center 114 of the display 202 away from the center of the image relative to the size of the image. That is, the distance of the position of the element 402 away from the center 114 of the display 202 relative to the size of the display 202 may be proportional to the offset amount relative to the size of the image.

Systems and Pointing Devices

Figure 9A:
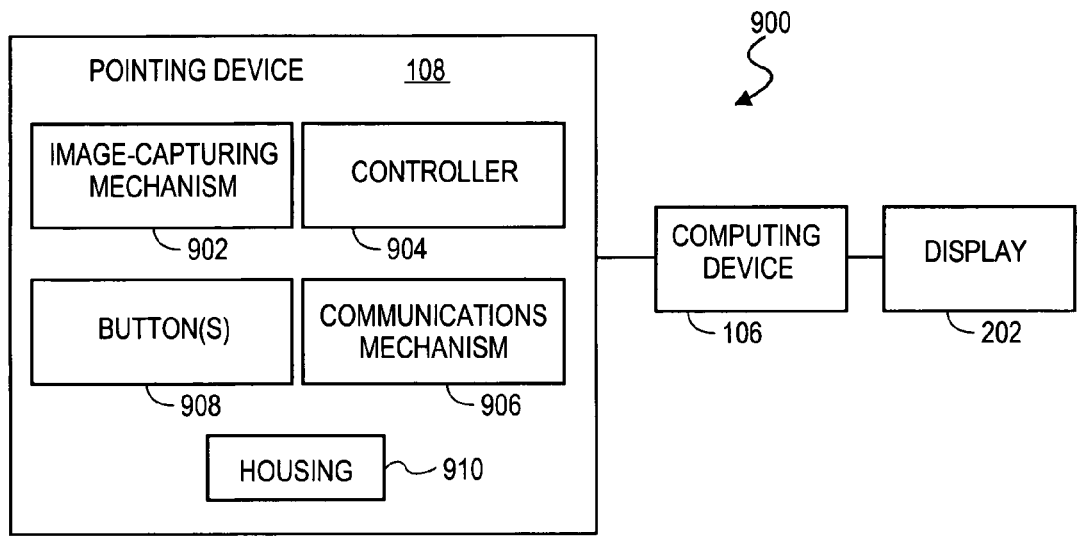
FIGS. 9A and 9B are block diagrams of systems including pointing devices having image-capturing mechanisms, according to varying embodiments of the invention.
Figure 9B:
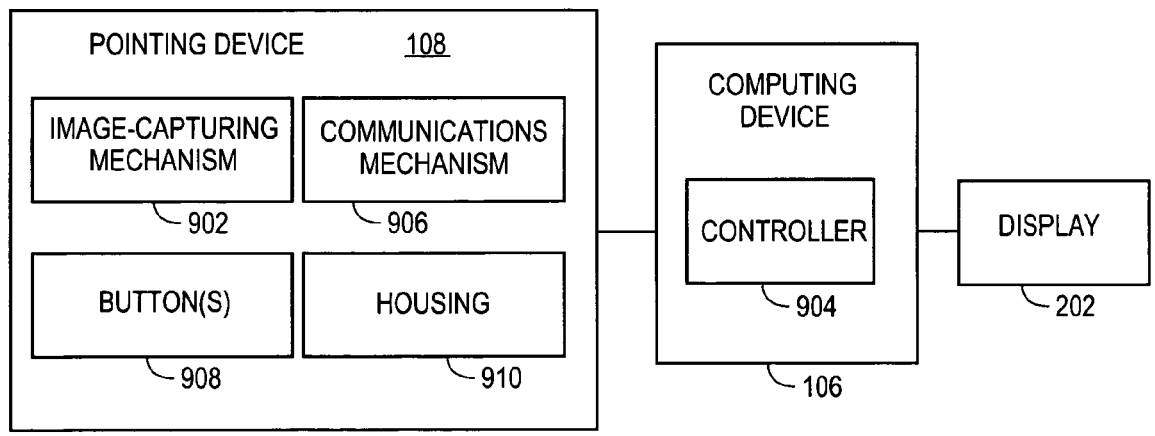

FIGS. 9A and 9B show a system 900, according to varying embodiments of the invention. The system 900 includes the pointing device 108, the computing device 106, and the display 202. The computing device 106 is communicatively connected to both the pointing device 108 and the display 202. The pointing device 108 includes an image-capturing mechanism 902, a communications mechanism 906, one or more buttons 908, and a housing 910. In the embodiment of FIG. 9A, the pointing device 108 also includes a controller 904, whereas in the embodiment of FIG. 9B, the computing device 106 includes the controller 904. As can be appreciated by those of ordinary skill within the art, the computing device 106 and the pointing device 108 may each include other components, in addition to and/or in lieu of those depicted in FIGS. 9A and 9B.

The image-capturing mechanism 902 is capable of capturing images, where each image has at least one corner of the display 202. The image-capturing mechanism 902 may be a camera device, a photosensitive device, and/or another type of image-capturing mechanism. The controller 904 is to determine positioning and/or relative movement for a graphical user-interface element displayed on the display 202, based on the images captured by the image-capturing mechanism 902, as has been described. The controller 904 may be implemented as hardware and/or software, such as software running on the computing device 106 in the embodiment of FIG. 9B.

The communications mechanism 906 enables the pointing device 108 to communicate with and be communicatively coupled to the computing device 106. The communications mechanism 906 may provide for wired and/or wireless communication between the pointing device 108 and the computing device 106. Where the controller 904 is part of the computing device 106, as in the embodiment of FIG. 9B, the communications mechanism 906 communicates the images captured by the image-capturing mechanism 902 to the controller 904, such that the controller 904—and hence the computing device 106—determines the positioning and/or relative movement for the graphical user-interface element. Where the controller 904 is part of the pointing device 108, as in the embodiment of FIG. 9A, the communications mechanism 906 communicates information regarding the positioning and/or relative movement for the graphical user-interface element, as determined by the controller 904.

The buttons 908 may include an activation button, which is actuated to cause the image-capturing mechanism 902 to capture images of the display 202. The image-capturing mechanism 902 may capture images while the activation button remains actuated, and until the activation button is released. Alternatively, the image-capturing mechanism 902 may capture images upon the activation button being actuated and released, and stops capturing images upon the activation button again being actuated and released. The presence of the activation button means that the user does not have to worry about constantly directing the pointing device 108 appropriately towards the display 202, where not doing so would cause the graphical-user interface element to be undesirably moved or positioned on the display 202.

The buttons 908 may also include one or more action buttons, which are actuated to cause actions relative to graphical user-interface elements, such as including or other than the graphical user-interface element 402 that has been described. Such action buttons may include a left button and a right button, to left-click and right-click a graphical user-interface element currently underneath a given graphical user-interface element, as can be appreciated by those of ordinary skill within the art. Finally, the housing 910 of the pointing device 108 may be that within which the image-capturing mechanism 902, the controller 904, the communications mechanism 906, and/or the buttons 908 are at least partially disposed.

Figure 10:
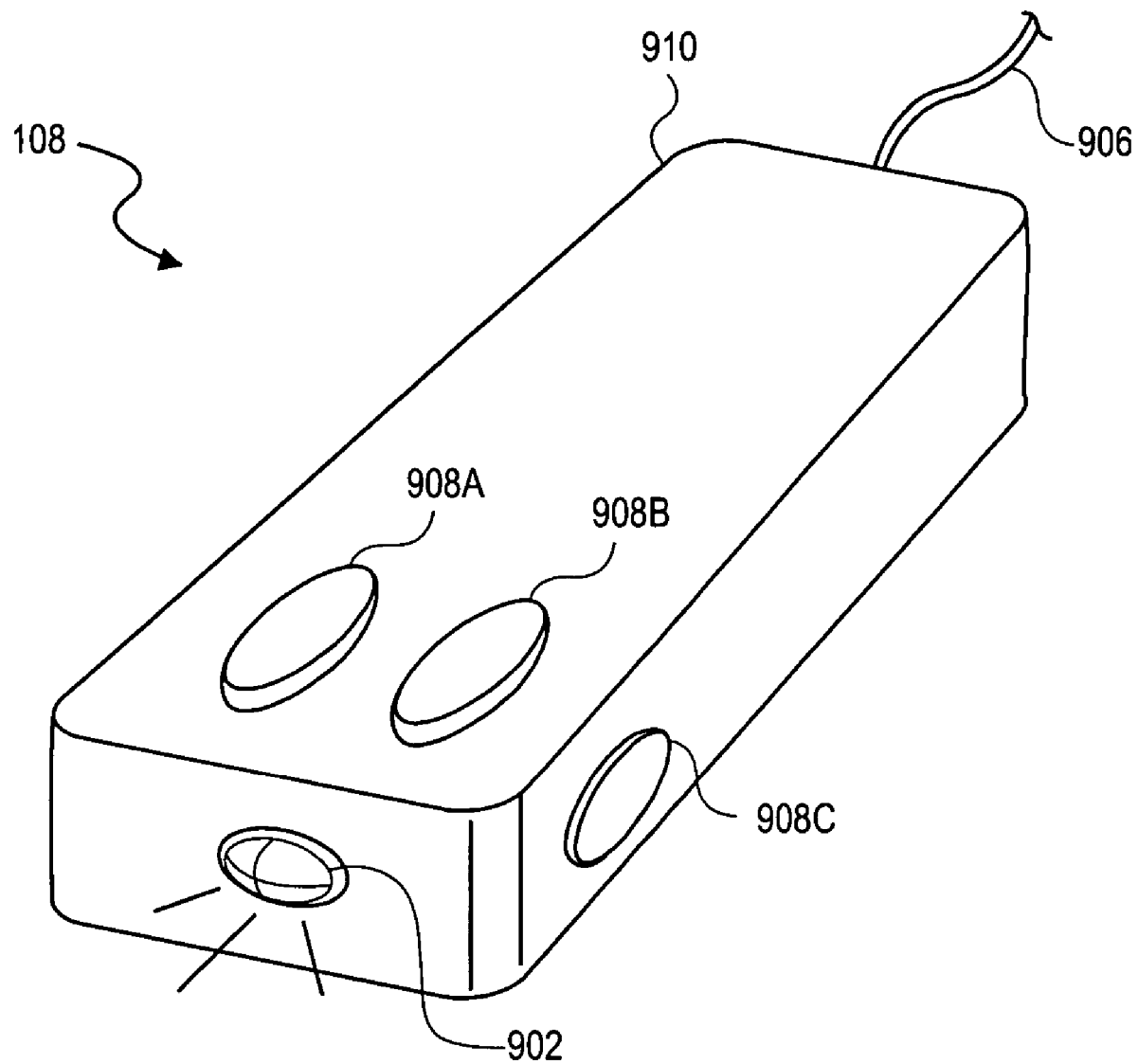
FIG. 10 is a perspective view of a pointing device having an image-capturing mechanism and various buttons, according to an embodiment of the invention.

FIG. 10 shows a perspective view of the pointing device 108, according to a particular embodiment of the invention. The buttons 908 specifically include the buttons 908A, 908B, and 908C disposed within surfaces of the housing 910. The buttons 908A and 908B may be action buttons, whereas the button 908C may be an activation button, as have been described. A portion of the image-capturing mechanism 902 is disposed within another surface of the housing 910, whereas the communications mechanism 906 in the embodiment of FIG. 10 is specifically a wired cable.

Figure 11:
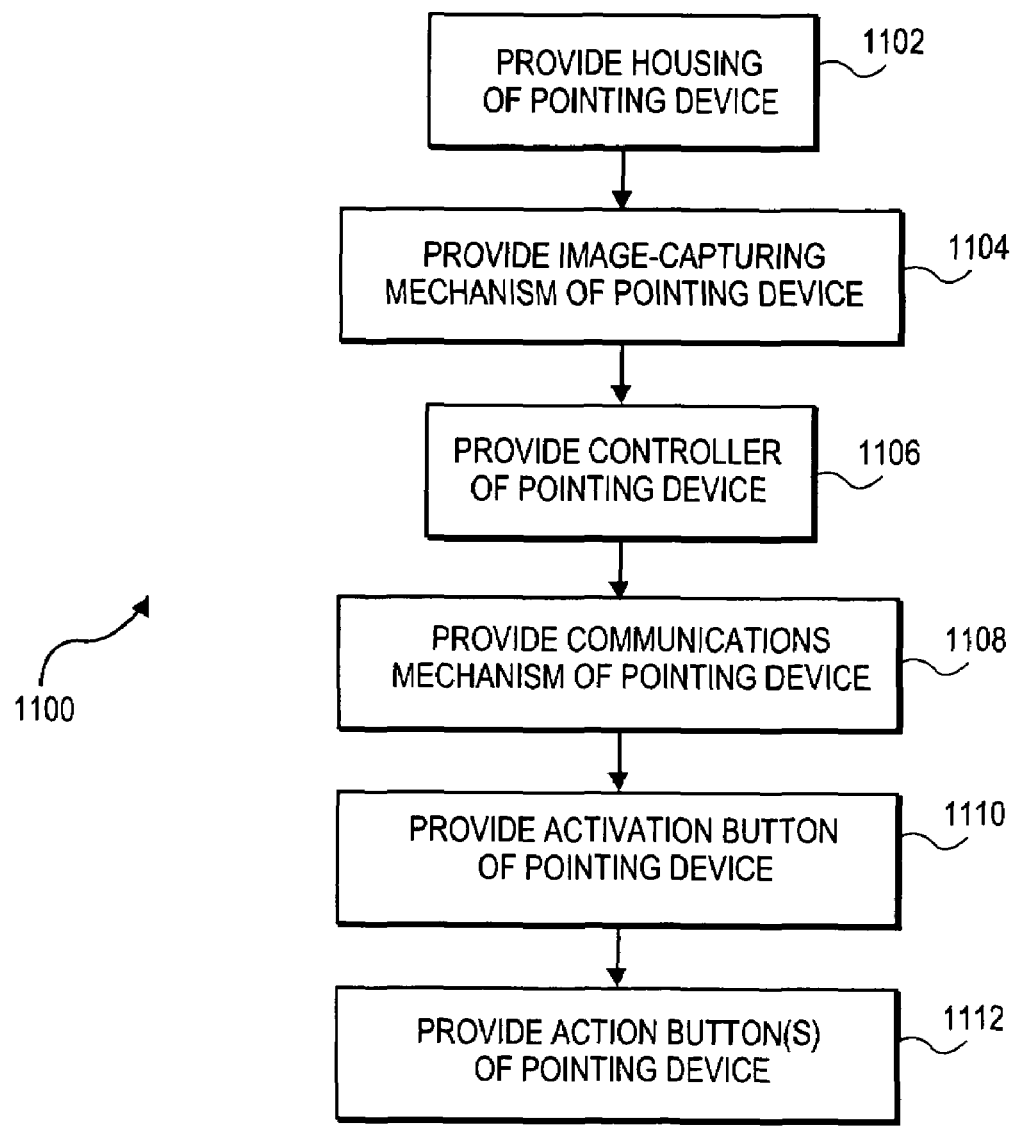
FIG. 11 is a method of manufacture for the pointing device of FIG. 10, according to an embodiment of the invention.

FIG. 11 shows a method 1100 for manufacturing the pointing device 108, such as the pointing device 108 of FIG. 10, according to an embodiment of the invention. The housing 910 of the pointing device 108 is initially provided (1102). The image-capturing mechanism 902 is provided and disposed within the housing 910 (1104). Likewise, the controller 904 is provided and disposed within the housing 910 (1106), as is the communications mechanism 906 (1108). Furthermore, the activation button 908C may be provided and disposed within the housing 910 (1110), as well as one or more action buttons, such as the action buttons 908A and 908B (1112).

CONCLUSION

It is noted that, although specific embodiments have been illustrated and described herein, it will be appreciated by those of ordinary skill in the art that any arrangement calculated to achieve the same purpose may be substituted for the specific embodiments shown. This application is intended to cover any adaptations or variations of the disclosed embodiments of the present invention. Therefore, it is manifestly intended that this invention be limited only by the claims and equivalents thereof.

I claim:

1. A system for a computing device comprising:
    an image-capturing mechanism capable of capturing images, each image including at least one corner of a display communicatively coupled to the computing device, the images including a first image including the at least one corner of the display and a second image including the at least one corner of the display; and,
    a controller to determine at least one of positioning and relative movement for a graphical-user interface element displayed on the display, based on the images captured by the image-capturing mechanism, by determining: a first location of the at least one corner of the display in the first image, a second location of the at least one corner of the display in the second image, and an amount and a direction of movement of the at least one corner of the display from the first location in the first image to the second location in the second image.

2. The system of claim 1, wherein at least one of the images includes the display completely.

3. The system of claim 1, wherein at least one of the images includes a center of the display.

4. The system of claim 1, wherein the controller is to determine positioning for the graphical-user interface element based on a position of the at least one corner of the display within an image captured by the image-capturing mechanism relative to a field of view of the image.

5. The system of claim 1, wherein the display is a brightest object within each image.

6. The system of claim 1, wherein the computing device is at least one of: a desktop computer, a laptop computer, a handheld computing device, a personal digital assistant (PDA) device, an audio-visual device, and a visual-only device.

7. The system of claim 1, wherein the image-capturing mechanism is at least one of a camera device and a photosensitive device.

8. The system of claim 1, wherein the display comprises at least one of: a cathode-ray tube (CRT) device; a liquid-crystal display (LCD) device; a flat-panel display (FPD) device; a plasma display device; and, an object on which images are projected by a projection display device.

9. The system of claim 8, wherein the object on which images are projected by the projection display device is a screen.

10. The system of claim 1, wherein the display is part of the computing device.

11. The system of claim 1, wherein the graphical-user interface element comprises a graphical-user interface pointer.

12. The system of claim 1, wherein the controller is part of the computing device.

13. The system of claim 12, wherein the controller comprises software running on the computing device.

14. The system of claim 12, wherein the controller comprises hardware.

15. A pointing device for a computing device comprising:
an image-capturing mechanism capable of capturing images, each image including at least one corner of a display communicatively coupled to the computing device, the images including a first image including the at least one corner of the display and a second image including the at least one corner of the display; and,
a communications mechanism to communicatively couple the pointing device to the computing device,
wherein at least one of positioning and relative movement for a graphical-user interface element displayed on the display is determined based on the images captured by the image-capturing mechanism, by determining: a first location of the at least one corner of the display in the first image, a second location of the at least one corner of the display in the second image, and an amount and a direction of movement of the at least one corner of the display from the first location in the first image to the second location in the second image.

16. The pointing device of claim 15, wherein at least one of the images includes the display completely, and at least one of the images includes a center of the display.

17. The pointing device of claim 15, wherein positioning for the graphical-user interface element is determined based on a position of the at least one corner of the display within an image captured by the image-capturing mechanism relative to a field of view of the image.

18. The pointing device of claim 15, wherein the display is a brightest object within each image.

19. The pointing device of claim 15, wherein the communications mechanism is to communicate the images captured by the image-capturing mechanism to the computing device, wherein the computing device is to determine at least one of positioning and relative movement for the graphical-user interface element displayed on the display based on the images captured by the image-capturing mechanism.

20. The pointing device of claim 15, further comprising a controller to determine at least one of positioning and relative movement for the graphical-user interface element displayed on the display based on the images captured by the image-capturing mechanism,
wherein the communications mechanism is to communicate information regarding at least one of positioning and relative movement for the graphical-user interface element as determined by the controller to the computing device.

21. The pointing device of claim 15, further comprising a housing within which the image-capturing mechanism and the communications mechanism are at least partially disposed.

22. The pointing device of claim 1, further comprising one or more buttons disposed within the housing.

23. The pointing device of claim 22, wherein the one or more buttons comprises an activation button that is actuated to cause the image-capturing mechanism to capture the images.

24. The pointing device of claim 22, wherein the one or more buttons comprises one or more action buttons that are actuated to cause actions relative to graphical-user interface elements displayed on the display.

25. The pointing device of claim 23, wherein the image-capturing mechanism is to capture the images while the activation button remains actuated until the activation button is released.

26. The pointing device of claim 23, wherein the image-capturing mechanism is to capture the images upon the activation button being actuated and released, and is to stop capturing the images upon the activation button being actuated and released again.

27. A pointing device for a computing device comprising:
means for capturing images of at least one corner of a display communicatively coupled to the computing device, the images including a first image including the at least one corner of the display and a second image including the at least one corner of the display; and,
means for determining relative movement for a graphical-user interface element displayed on the display based on a change in position of the at least one corner of the display between the first image and the second image captured by the image-capturing mechanism, by determining: a first location of the at least one corner of the display in the first image, a second location of the at least one corner of the display in the second image, and an amount and a direction of movement of the at least one corner of the display from the first location in the first image to the second location in the second image.

28. A pointing device for a computing device comprising:
means for capturing images of at least one corner of a display communicatively coupled to the computing device, the images including a first image including the at least one corner of the display and a second image including the at least one corner of the display; and,
means for determining positioning for a graphical-user interface element displayed on the display based on a position of the at least one corner of the display within an image captured by the image-capturing mechanism relative to a field of view of the image, by determining: a first location of the at least one corner of the display in the first image, a second location of the at least one corner of the display in the second image, and an amount and a direction of movement of the at least one corner of the display from the first location in the first image to the second location in the second image.

29. A method comprising:
capturing a first image of at least one corner of a display communicatively coupled to a computing device;
capturing a second image of the at least one corner of the display;
determining an amount and a direction of movement of the at least one corner of the display between the first image and the second image; and,
causing a graphical-user interface element displayed on the display by the computing device to move based on the amount and the direction of the movement of the at least one corner of the display,
wherein determining the amount and the direction of movement of the at least one corner of the display between the first image and the second image comprises:
   determining a first location of the at least one corner of the display in the first image;
   determining a second location of the at least one corner of the display in the second image; and,
   determining the amount and the direction of movement of the at least one corner of the display from the first location in the first image to the second location in the second image.

30. The method of claim 29, further comprising a user moving a pointing device having an image-capturing mechanism and communicatively coupled to the computing device between the image-capturing mechanism capturing the first image and the second image in a direction and by an amount at which the user desires to have the graphical-user interface element moved.

31. The method of claim 29, wherein causing the graphical-user interface element displayed on the display by the computing device to move based on the amount and the direction of the movement of the at least one corner of the display comprises causing the graphical-user interface element to move in a direction opposite to the direction of the movement of the at least one corner of the display by an amount relative to a size of the display proportional to the amount of the movement of the at least one corner of the display relative to a size of the image.

32. A method comprising:
capturing an image of at least a center of a display communicatively coupled to a computing device;
determining a location of at least the center of the display within the image;
determining an offset amount and an offset direction between the location of at least the center of the display within the image and a center of the image; and,
causing a graphical-user interface element to be displayed on the display by the computing device at a position based on the offset amount and the offset direction between the location of at least the center of the display within the image and the center of the image.

33. The method of claim 32, further comprising a user aiming a pointing device having an image-capturing mechanism and communicatively coupled to the computing device at a position at which the user desires to have the graphical-user interface element displayed.

34. The method of claim 32, wherein causing the graphical user-interface element to be displayed on the display by the computing device at a position based on the offset amount and the offset direction between the location of at least the center of the display within the image and the center of the image comprises causing the graphical user-interface to be displayed on the display at a position offset from a center of the display relative to a size of the display proportional to the offset amount relative to a size of the image and in a direction opposite of the offset direction.

35. A method comprising:
providing an image-capturing mechanism of a pointing device capable of capturing images, each image including at least one corner of a display communicatively coupled to a computing device, the images including a first image including the at least one corner of the display and a second image including the at least one corner of the display; and,
providing a controller of the pointing device capable of determining at least one of positioning and relative movement for a graphical-user interface element displayed on the display, based on the images captured by the image-capturing mechanism, by determining: a first location of the at least one corner of the display in the first image, a second location of the at least one corner of the display in the second image, and an amount and a direction of movement of the at least one corner of the display from the first location in the first image to the second location in the second image.

36. The method of claim 35, further comprising providing a communications mechanism of the pointing device capable of communicating at least one of positioning and relative movement for the graphical-user interface element from the controller to the computing device.

37. The method of claim 35, further comprising providing an activation button of the pointing device that is capable of being actuated to cause the image-capturing mechanism to capture the images.

38. The method of claim 35, further comprising providing one or more action buttons that are capable of being actuated to cause actions relative to graphical-user interface elements displayed on the display.

39. The method of claim 35, further comprising providing a housing within which the image-capturing mechanism and the controller are at least partially disposed.

* * * * *

UNITED STATES PATENT AND TRADEMARK OFFICE
CERTIFICATE OF CORRECTION

PATENT NO.         : 7,420,540 B2
APPLICATION NO. : 10/726078
DATED              : September 2, 2008
INVENTOR(S)        : Craig A. Olbrich It is certified that error appears in the above-identified patent and that said Letters Patent is hereby corrected as shown below:

On the face page, in field (76), in "Inventor", in column 1, line 1, delete "2923 NE. Conser St.," and insert -- 29094 Tampico Rd --, therefor.

In column 10, line 22, in Claim 22, delete "claim 1," and insert -- claim 21, --, therefor.

Signed and Sealed this

Thirty-first Day of March, 2009

JOHN DOLL
*Acting Director of the United States Patent and Trademark Office*